UNITED STATES PATENT OFFICE.

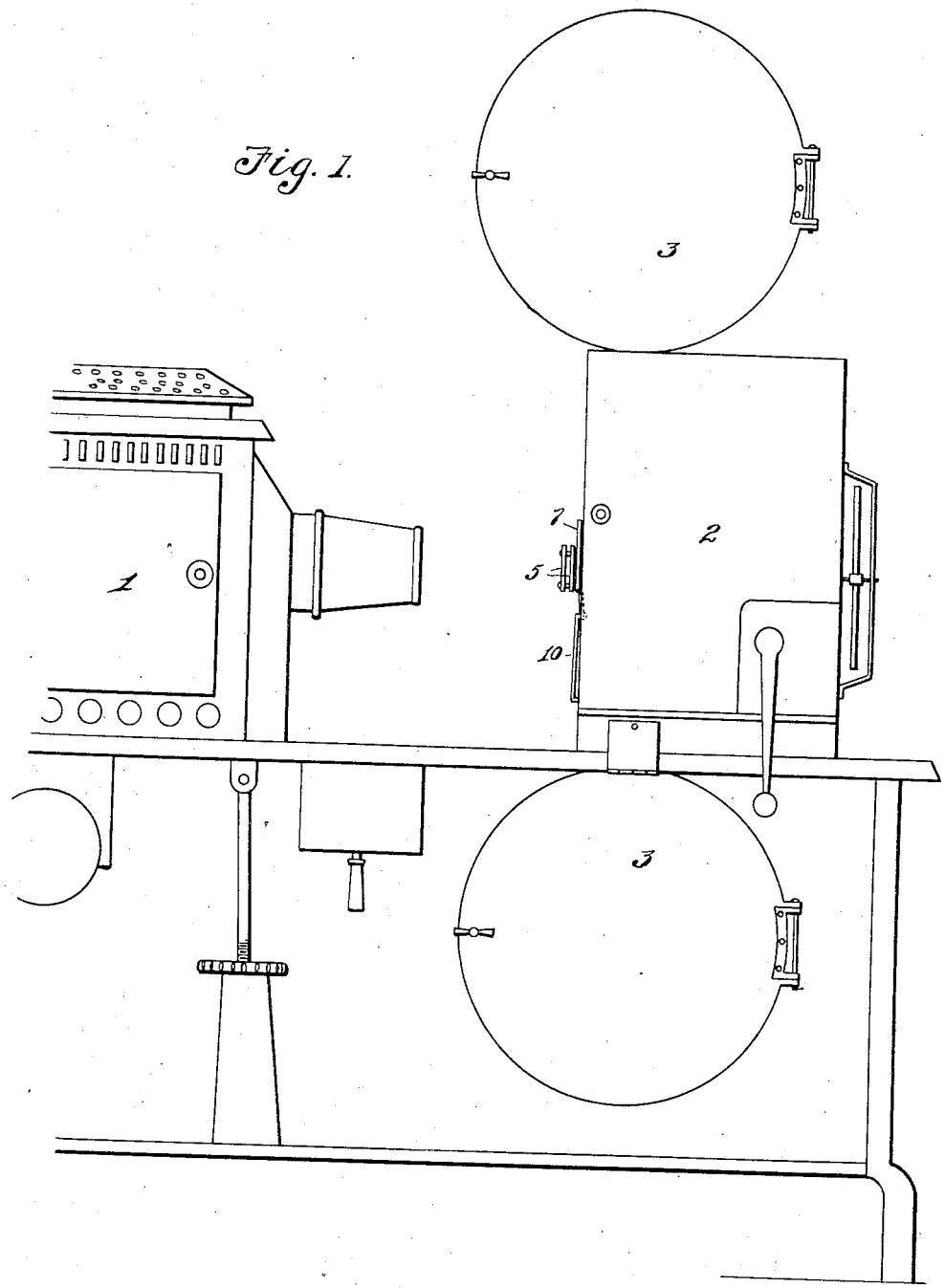

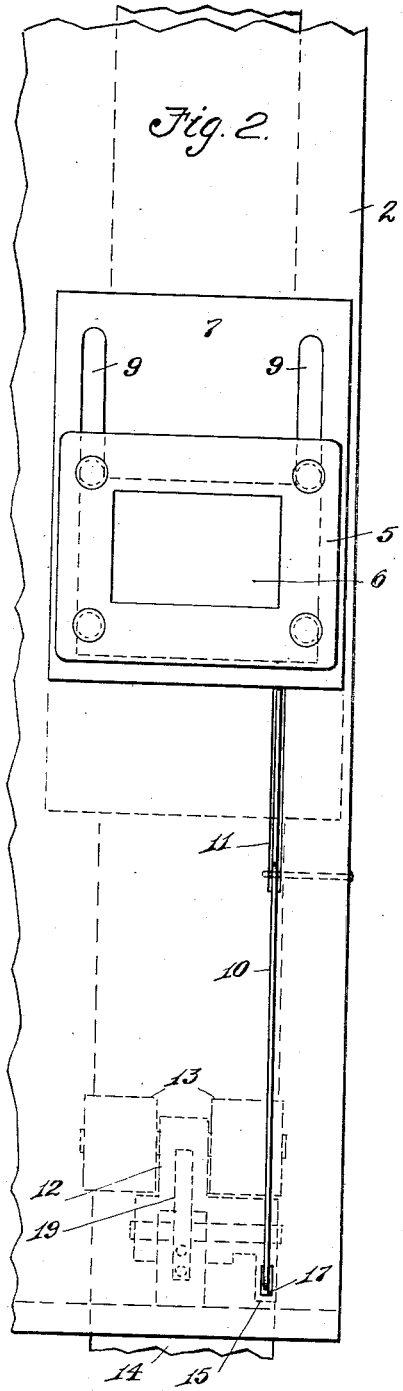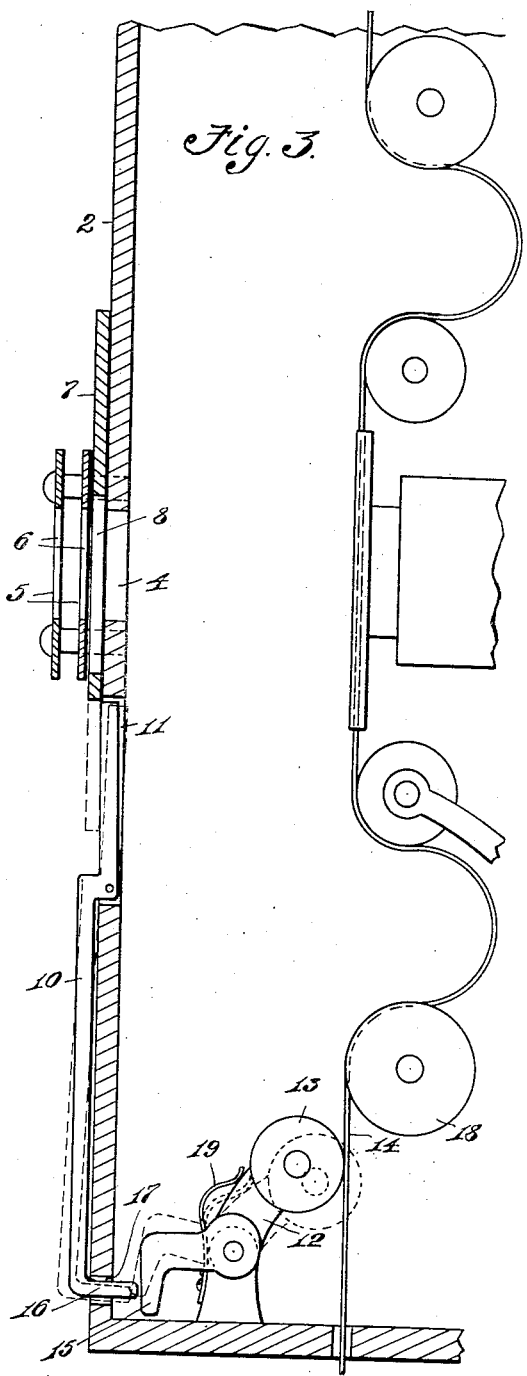

BASIL G. DOWNER, OF SOUTH BEND, INDIANA, ASSIGNOR OF ONE-HALF TO GEORGE H. HINES, OF SOUTH BEND, INDIANA.

ATTACHMENT FOR MOVING-PICTURE MACHINES.

1,307,541.  Specification of Letters Patent.  Patented June 24, 1919.

Application filed October 3, 1917. Serial No. 194,445.

*To all whom it may concern:*

Be it known that I, BASIL G. DOWNER, a citizen of the United States, residing at South Bend, in the county of St. Joseph and State of Indiana, have invented certain new and useful Improvements in Attachments for Moving-Picture Machines, of which the following is a specification.

This invention relates to an improvement in fire-protective means for moving picture apparatus, wherein a fire shutter is caused or permitted to close automatically upon breaking of the film, the closing of the shutter closing the film box against the light rays.

The improvement is directed to providing a shutter, preferably arranged between the inner cooling plate and the wall of the film box, the shutter being arranged to move by gravity to closing position. A lever is arranged to support the shutter in open, or light admitting position, and a trip is provided, governed by the film, and operating to trip the lever and release the shutter when the film is broken.

The invention will be described in the following specification, reference being had to the accompanying drawings, in which:—

Figure 1 is a view in elevation of a motion picture apparatus, the improved fire-protecting means being in position.

Fig. 2 is an enlarged front elevation of one wall of the film box, the fire-shutter being shown in open or light admitting position.

Fig. 3 is a vertical section of the same, the positions of the shutter and actuating parts being shown in operative relation in dotted lines.

The motion picture apparatus is indicated generally in Fig. 1, being there shown as including the light chamber, or box 1, the film box, 2, the film spools or reels 3, the improved fire-protecting means being shown as applied to that wall of the film box next to the light chamber.

In the usual construction, the wall of the film box next to the light chamber is provided with an opening, as 4, through which light is admitted to the film, and this opening in the wall of the box, is protected by cooling plates 5, arranged in spaced parallel relation and having openings 6, in registry with the opening 4. The spacing of the plates 5 permits a free air circulation between them, as is understood.

The present invention is directed to providing a fire shutter, adapted under predetermined conditions to close the light admitting opening into the film box. This shutter is here shown as a plate 7, arranged between the inner cooling plate 5 and the film box wall, the shutter plate being formed with a light admitting opening 8, to register with the openings 4 and 6, when the shutter is in open position. The shutter plate is preferably formed with longitudinally arranged slots 9, adapted to engage the pins holding the cooling plates in place, thus conveniently mounting the shutter, and limiting, by the length of the slots, the lowering or operative movement of such shutter, when free to act.

A lever 10 is pivotally mounted on the wall of the film box, below the shutter, the upper and lower portions of the lever being offset, so that the upper portion may operate in a slot 11, formed in the box wall, while the lower portion is arranged beyond the wall. This permits the upper end of the lever to be moved to a position beneath and supporting the shutter, or to a position inwardly of and beyond the shutter, to free the latter for operative movement.

A trip is mounted in the film box, preferably on the bottom thereof. The trip comprises an arm pivotally supported on a bracket, the inner end of such arm 12, having a roller bearing 13, formed to provide a rolling contact to bear against the film, indicated at 14. The opposite end of the arm 12 is turned downwardly to form a lug 15, adapted to engage a lateral projection or foot 16, formed at the lower end of the lever 10, and projecting through an opening 17 formed in the film box wall.

The trip is arranged to bear against the film, preferably below the take-up sprocket, as 18, and as long as the film is under feeding tension and intact the inner end of the trip is elevated, and the lug 15, held from contact with the foot 16 of the lever. Under these conditions the upper end of the lever 10 engages beneath the shutter, and supports the latter in position to admit light to the film box. Upon breaking of the film, however, the inner end of the trip lowers, by overbalancing, or assisted by a leaf spring 19, if preferred, the lug 15 strikes the foot of the lever, and the upper end of the lever is withdrawn from beneath the shutter plate. The shutter immediately drops to the limit of its slots 9, completely and fully closing the light admitting opening to the film box, and preventing the focused light rays setting the film on fire.

A characteristic feature of the present improvement is the control of the fire shutter through breakage of the film, so that the device is entirely independent of the film feeding devices, but is instantly responsive to film breakage. Furthermore, the improvement may be readily applied to motion picture apparatus, as now used, without requiring any change in the film controlling devices, or providing space or connected parts for the shutter. The operating parts are entirely independent of the film controlling means, and may be applied and operated without regard to the specific structure of such means.

Having thus described the invention, what is claimed as new is:—

The combination with a film box formed with a light-admitting opening and cooling plates secured thereto, of a shutter formed with slots to slidably engage the cooling-plate connecting means, a lever pivoted on the box and having one end adapted to be moved to and from a position beneath the lower edge of the shutter, an arm pivotally mounted in the box with one end formed for rolling contact with the film, the opposite end of the arm being adapted to engage and operate the lever upon breakage of the film.

In testimony whereof I affix my signature.

BASIL G. DOWNER.